United States Patent Office 3,417,095
Patented Dec. 17, 1968

---

3,417,095
METHOD OF PRODUCING PYRIDOXINE BY REDUCING A PRECURSOR GAMMA LACTONE WITH A COMPLEX BOROHYDRIDE
Aldo Fabrucci, Anacleto Gianantonio, and Sergio Sacerdoti, Milan, Italy, assignors to Lepetit S.p.A., Milan, Italy
No Drawing. Filed Feb. 9, 1966, Ser. No. 526,030
Claims priority, application Great Britain, Mar. 8, 1965, 9,732/65
2 Claims. (Cl. 260—296)

ABSTRACT OF THE DISCLOSURE

Improved yields (as high as 97%) of a pyridoxine, its hydrochloride, and some of its known intermediates are obtained by gradually adding a solution of 1–2 moles of sodium borohydride in a lower alkanol to a mixture, in a lower alkanol, of about 0.5–1 mole of $CaCl_2$ and one mole of a compound of the general formula

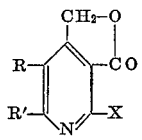

wherein R represents hydroxy, acyloxy or amino, R' is a lower alkyl radical and X is hydrogen or halogen, at a temperature of 10–60° C., $Ca(BH_4)_2$ being formed in situ.

---

This invention is concerned with a process for the production of pyridoxine (Vitamin $B_6$) and chemical compounds useful as intermediates in the synthesis of pyridoxine.

The object of this invention is to provide a convenient method for producing pyridoxine and some of the known intermediates for the synthesis of pyridoxine, by hydrogenation under controlled conditions of a pyridine compound having a lactone ring.

More particularly, the process which forms the subject of this application consists in adding a solution of 1–2 moles of sodium borohydride in a lower alkanol to a mixture, in a lower alkanol, of about 0.5–1 mole of $CaCl_2$ and one mole of a compound having the general formula:

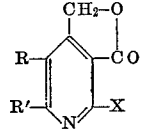

wherein R represents hydroxy, acyloxy or amino, R' is a lower alkyl radical and X is hydrogen or halogen, at a temperature of 10–60° C. to produce compounds of the formula

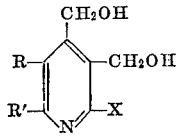

wherein R, R' and X have the above-defined significance.

It will be appreciated by those skilled in the field of vitamin chemistry that, when in the generic formula of the product R represents hydroxy and X is hydrogen, the product of the process will be pyridoxine. On the other hand, when R and X have the other significances, hydrogenation will give known and useful intermediates for the synthesis of Vitamin $B_6$.

If the intermediate contains an amino group, it will then be necessary to convert it into a hydroxy group. If a chlorine atom is present at position 6, it has to be split off by hydrogenation. If an acyloxy group is present at position 3, it will be hydrolysed to the free hydroxy. In each case, well known procedures can be used.

The advantage of the process of this invention resides in the surprisingly high yields which are obtained in the last step of one of the several pyridoxine syntheses and in the preparation of some useful intermediates for other syntheses of the same vitamin.

The unexpected result is obtained, as above stated, by working under particularly controlled conditions. One of these conditions is the ratio of $NaBH_4$, which is only ½ equi-molecular amounts in respect of the lactone to be reduced. Another critical feature is the temperature, which is 10–60° C., and preferably 30–45° C., contrary to the usual hydrogenations with earth alkali borohydrides, which are carried out under 0° C. Moreover, an important and previously unsuspected effect is obtained by the gradual addition of $NaBH_4$ to the starting lactone admixed with a sufficient amount of $CaCl_2$ to cause the formation in situ of $Ca(BH_4)_2$, which is the actual hydrogenating agent.

The following non-limitative examples illustrate the procedure which forms the subject of this invention.

EXAMPLE 1

Pyridoxine

To a mixture of 16.5 g. of 2-methyl-3-hydroxy-4-hydroxymethyl-5-pyridinecarboxylic acid lactone in 150 ml. of propanol, previously made neutral by the addition of a stoichiometric amount (2.8 g.) of calcium oxide, 8 g. of anhydrous calcium chloride are added and the mixture is heated and maintained at a temperature of 35°–45° C. A solution of 4.5 g. of $NaBH_4$ in 150 ml. of propanol is then gradually added over about 60 minutes. The mixture is then cooled to about 0° C., and the formed precipitate is removed by filtration. The solution is made acidic with concentrated hydrochloric acid, then evaporated to dryness, and the residue is treated with methanol containing gaseous hydrogen chloride. The solvent is slowly distilled off to dryness and the residue is recrystallized from ethanol. Yield 20.8 g. (97%) of pyridoxine hydrochloride, M.P. 204–208° C.

From the hydrochloride the free base may be obtained by conventional procedures, such as treatment with ammonia of an aqueous solution.

EXAMPLE 2

2-methyl-3-amino-4,5-dihydroxymethylpyridine

To a mixture of 16.4 g. of 2-methyl-3-amino-4-hydroxymethyl-5-pyridinecarboxylic acid lactone, 12 g. of anhydrous $CaCl_2$ and 150 ml. of ethanol, maintained at a temperature of 25–30° C., a solution of 7.6 g. of $NaBH_4$ in 200 ml. of ethanol is gradually added over 40 minutes. After cooling, the mixture is made acidic by the addition of aqueous concentrated HCl and evaporated to dryness. The residue is dissolved in water and adjusted to pH about 9 by the addition of aqueous ammonia. The precipitate is collected and recrystallised from water. Yield 16.2 g. (96%) of 2-methyl-3-amino-4,5-dihydroxymethylpyridine, M.P. 144–146° C.

EXAMPLE 3

2-methyl-3-amino-4,5-dihydroxymethyl-6-chloropyridine

To a mixture of 25 g. of 2-methyl-3-amino-4-hydroxymethyl-6-chloro-5-pyridinecarboxylic acid lactone, 12 g. of $CaCl_2$ and 250 ml. of ethanol, maintained at 35–40° C., a solution of 7 g. of $NaBH_4$ in 200 ml. of ethanol is added over about 45 minutes. After cooling, the mixture is worked up as described in Example 2. Yield 24.5 g.

(96%) of 2-methyl-3-amino-4,5-dihydroxymethyl-6-chloropyridine, M.P. 181–183° C.

We claim:
1. A process for preparing a compound of the formula:

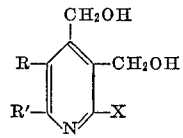

wherein R is a member of the class consisting of hydroxy and amino, R' is a lower alkyl radical, and X is a member of the class consisting of hydrogen and halogen, which comprises gradually adding a solution of 1 to 2 moles of sodium borohydride in a lower alkanol to a mixture, in a lower alkanol, of about 0.5 to 1 mole of calcium chloride and one mole of a compound of the formula

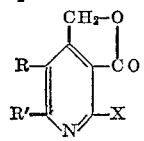

wherein R, R' and X have the above significance, at a temperature of 10–60° C.

2. A process as in claim 1 wherein the temperature during the reduction is maintained between 35° and 45° C.

References Cited

UNITED STATES PATENTS 2,918,471  12/1959  Mowat et al. _____ 260—297.5

OTHER REFERENCES

Kollonitsch: Nature, vol. 175, p. 346 (1955) Abstracted by Chemical Abstracts, vol. 50, par. 1774e (1956).

Matsui: Chemical Abstracts, vol. 52, par. 8040, (1958).

HENRY R. JILES, *Primary Examiner.*

A. L. ROTMAN, *Assistant Examiner.*

U.S. Cl. X.R.

260—297.5, 297; 167—81